May 6, 1930.  C. A. GRATIOT  1,757,186
RESILIENTLY MOUNTED LEDGER BLADE FOR LAWN MOWERS
Filed Dec. 15, 1927
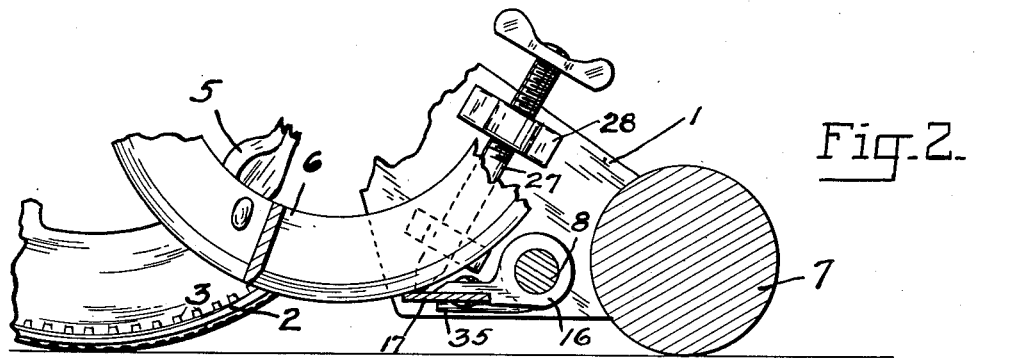
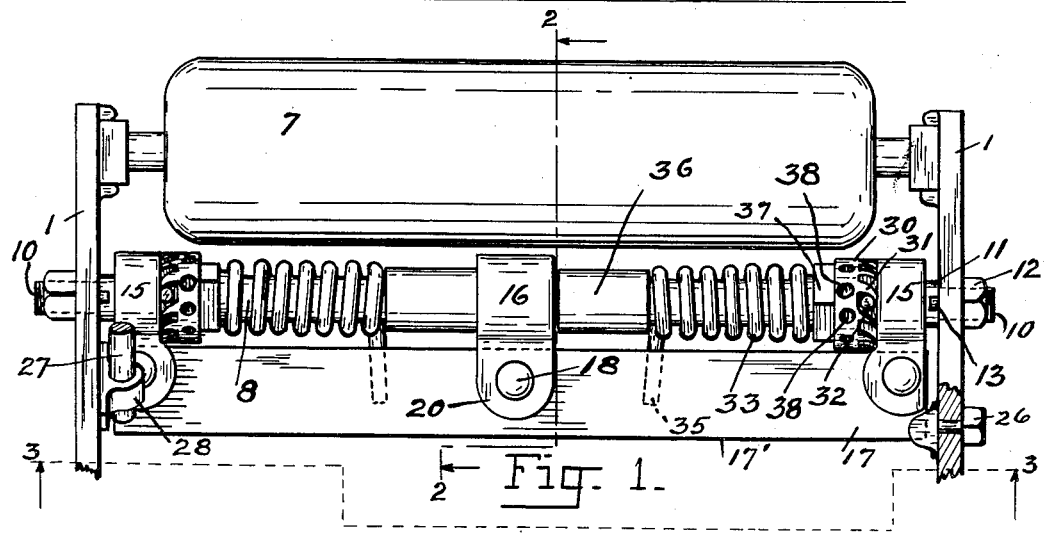
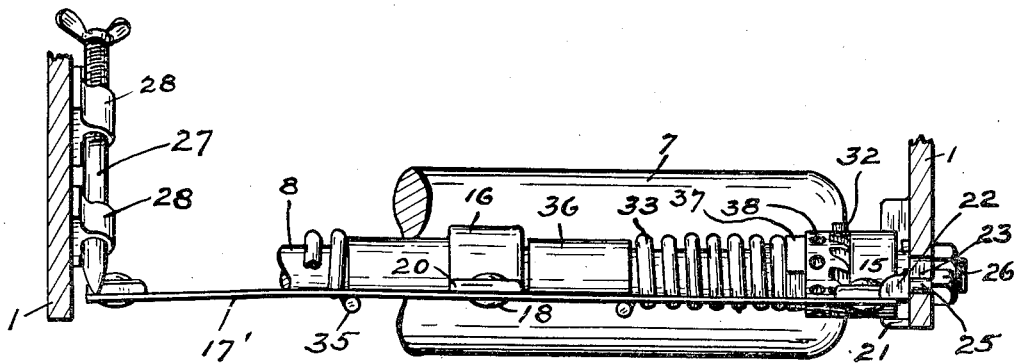
INVENTOR.
Chester A. Gratiot
BY Homer Barnes
ATTORNEY.

Patented May 6, 1930

1,757,186

UNITED STATES PATENT OFFICE

CHESTER A. GRATIOT, OF PORTLAND, OREGON, ASSIGNOR, BY MESNE ASSIGNMENTS, TO EVERSHARP LAWNMOWER COMPANY, A CORPORATION OF NEVADA

RESILIENTLY-MOUNTED LEDGER BLADE FOR LAWN MOWERS

Application filed December 15, 1927. Serial No. 240,196.

This invention relates to improvements in lawn mowers, and particularly to the stationary shearing ledger blade thereof.

The object of my invention is to provide a lawn mower of simple and practical construction in which the cutting knives of the revolving reel may be maintained automatically in effective shearing contact with the lower stationary blade.

A further object of the invention is the provision of a lawn mower having its ledger blade resiliently mounted to contact with the knives of the cutting reel and which may be adjustable with relation thereto, to be yieldingly engaged with the cutting blades with a desired amount of pressure.

A still further object of the invention is the provision of novel means for regulating the spring tension on the ledger blade.

Other objects and advantages of my invention, and objects relating to details of construction and arrangement of parts thereof, will be fully apparent in the course of the detailed description to follow.

The accompanying drawings illustrate by way of example a preferred embodiment of my invention, in which:

Figure 1 is a fragmentary plan view of a lawn mower illustrating the details of my invention.

Fig. 2 is a view in cross section on line 2—2 of Fig. 1.

Fig. 3 is a fragmentary view in vertical cross section on line 3—3 of Fig. 1.

Referring to said views, the reference numerals 1 indicate the opposite side frames of a lawn mower embodying my invention and 2 the traction wheels thereof mounted in said frames in the usual manner, said wheels having internal gear teeth 3 through which the usual pinions, not shown, are engaged to actuate a cutting reel 5 upon which spiral or other suitable blades, as 6, are engaged.

The usual wooden roller 7 is adjustably mounted in the side frames 1 whereby the elevation of the cutting reel relative to the grass to be cut may be adjusted. 8 indicates a rod extending transversely of the machine in advance of the roller 7 which is rigidly secured at its opposite ends in the side frames 1 having reduced threaded ends 10 extending through apertures in the side frames and secured against shoulders 11 by nuts 12. Said rod is secured against rotation by means of keys 13.

End brackets 15 are pivotally mounted on the rod 8 adjacent the frames 1, and one or more similar brackets 16 are mounted in like manner on the rod intermediate the end bracket. A stationary ledger blade 17 is rigidly connected to the respective brackets through rivets 18 extending through lugs 20 integral with the brackets so that the blade will be free to move pivotally about the rod 8 within limits set by a lower fixed stop 21 on one of the frames 1 and an upper adjustable stop 22 immediately thereabove, between which the respective end of the ledger blade is received.

A slot 23 is formed in the respective frame 1 to receive a stud 25 extending from the lug 22 and which is screw threaded to receive a nut 26 through which said stud may be rigidly fixed in adjustable position to maintain the ledger blade at a desired height. Upon the opposite frame 1 an inclined set screw 27 is mounted in spaced barrels 28, the upper of which is internally screw threaded to engage with the threads of said screw. The lower end of said screw impinges on the extremity of the ledger blade 17 to adjustably limit its height, and to depress the extreme end of the ledger-blade sufficiently to admit of the advance ends of the blades 6 striking slightly within the end of the ledger-blade.

Inwardly of each of the brackets 15 a nut 30 is rotatably mounted on the rod 8 and is formed with its face adjacent the respective bracket with ratchet teeth 31 between which a pin or lug 32 secured to the respective bracket engages. A coil spring 33 is secured at one end to each of said nuts, and its other end extends forwardly under the ledger blade, as at 35, to yieldingly urge said blade upwardly against the lug 22 and the set screw 27. The inner portion of the spring 33 may bear against an enlarged central portion 36 of the rods 8. It will be evident that the spring 33 may be given more or less tension through the rotation of the nut 30 with relation to the pin 32 to engage one of the respective notches 31 therewith. To aid in the rotation of the nut it may be provided with squared shoulders 37 for the application of a monkey wrench or with a plurality of holes 38 within which a spanner wrench may be applied.

In operation the springs 33 are given a desired amount of tension by the aforesaid manipulation of the nuts 30 which, through the engagement of the spring ends 35 yieldingly press the stationary blade 17 upwardly against the lug 22 at one end and the set screw 27 at its other end. The lug 22 is positioned desirably to admit of the front or cutting edge 17' of the lower knife engaging the cutting edges of the spiral blades 6. The opposite end of the stationary blade is desirably depressed slightly below the point of contact with the spiral blades by suitable manipulation of the set screw 27, so that the extreme advance ends of the spiral blades will pass freely over the stationary knife and then engage the stationary blade within a short distance on an inclined plane, whence in its contact along the edge of the lower blade the spiral knives will slightly depress it against the yielding pressure of the spring 35. An efficient contact is thus insured between the revolving knives and the stationary blade, affording a uniform shearing action through the length of the blades.

From the foregoing description, taken in connection with the accompanying drawings, the advantages of the construction and application of my improved resiliently mounted ledger blades for lawn mowers will be readily apparent; but, while I have described the principle of operation of the invention, together with the devices which I now consider the best embodiment thereof, it will be readily apparent that the structures shown are merely illustrative and that such changes may be made therein as will lie within the scope of the following claims.

Having described my invention, what I claim, is:

1. In a lawn mower, a revolving cutting reel, a pivotally mounted lower blade extending transversely of the mower, means to resiliently urge said blade toward said reel, stops at one end of the mower to limit the movement of said blade in either rotary direction, and a set screw at the opposite end of the mower to depress the end of the blade to the desired amount.

2. In a lawn mower, a rod rigidly mounted in the side frames of the mower, a blade pivotally mounted upon said rod, adjustable stops on said frame limiting the upward movement of said blade, coil-springs about said rod for resiliently urging said blade against said stops, and means to adjust the tension on said springs.

3. In a lawn mower, a rod rigidly mounted in the side frames of the mower, a blade pivotally mounted on said rod, a coil-spring about each end of said rod, one end of each of said springs resiliently supporting said blade, and a ratchet device rotatably mounted on said rod in which the opposite ends of said springs are secured to vary the tension of the springs.

4. In a lawn mower, a rod rigidly mounted in the side frames of the mower, a blade pivotally mounted upon said rod, stops on said frame limiting the upward movement of said blade, coil-springs about each end of said rod, one end of each said spring resiliently supporting said blade against said stops, a pin projecting laterally at each end of said rod, and a nut rotatably mounted at each end of said rod in which the opposite ends of said springs are secured formed with notches in which said pin may be adjustably engaged whereby the tension on said springs may be varied.

CHESTER A. GRATIOT.